United States Patent [19]

Fritzvold et al.

[11] 4,123,317

[45] Oct. 31, 1978

[54] METHOD AND AN APPARATUS FOR PROCESSING FINELY DIVIDED FIBROUS PULP WITH GAS WITHOUT OVERPRESSURE

[75] Inventors: Bjørn H. Fritzvold; Helge Carling; Leif H. Eriksen, all of Oslo, Norway

[73] Assignee: Myrens Verksted A/S, Oslo, Norway

[21] Appl. No.: 737,033

[22] Filed: Oct. 29, 1976

[30] Foreign Application Priority Data

Oct. 31, 1975 [NO] Norway ............................... 3661/75

[51] Int. Cl.² ........................ D21C 3/24; D21C 7/00; D21C 9/10

[52] U.S. Cl. ..................................... 162/17; 68/5 C; 162/19; 162/57; 162/63; 162/65; 162/237; 162/243

[58] Field of Search ..................... 162/65, 63, 57, 237, 162/243, 17, 19, 52, 246; 23/283; 68/181 R, 5 D, 5 R, 5 C; 8/156, 111, 149.2; 209/389, 262

[56] References Cited

U.S. PATENT DOCUMENTS

| | | | |
|---|---|---|---|
| 1,843,465 | 2/1932 | Traquair | 162/19 |
| 1,942,622 | 1/1934 | Traquair et al. | 162/19 |
| 2,399,016 | 4/1946 | Gits | 222/242 X |
| 2,511,096 | 6/1950 | Bate | 162/65 |
| 2,646,024 | 7/1953 | Smallegan | 222/227 X |
| 2,662,821 | 12/1953 | Muench | 162/237 |
| 2,826,126 | 3/1956 | Cowles | 209/389 |
| 3,201,001 | 8/1965 | Roberts et al. | 222/227 X |
| 3,660,225 | 5/1972 | Verreyne et al. | 162/65 X |
| 3,684,651 | 8/1972 | Reinhall | 162/52 |
| 3,754,417 | 8/1973 | Jamieson | 162/65 X |
| 3,964,962 | 6/1976 | Carlsmith | 162/65 X |

OTHER PUBLICATIONS

Eachus; "Atmospheric – Pressure Oxygen Bleaching" TAPPI, Sep. 1975, vol. 58, No. 9.
Rothenberg et al; "Bleaching of Oxygen Pulps with Ozone" TAPPI, Aug. 1975, vol. 58, No. 8.

Primary Examiner—S. Leon Bashore
Assistant Examiner—Steve Alvo
Attorney, Agent, or Firm—Holman & Stern

[57] ABSTRACT

A method and apparatus for treating finely divided fibrous pulp with gas without overpressure in a continuous process. The bulk material is substantially continuously supplied to a reactor having one or more supporting floors having apertures of a shape and size which allow the finely divided material to form bridges across the apertures, said apertures also permitting a continuous flow of gas through the bulk material. The bulk material proceeds through the reactor as a consequence of the bridges being broken by breaking arms sweeping along the upper surface of the supporting floors.

25 Claims, 7 Drawing Figures

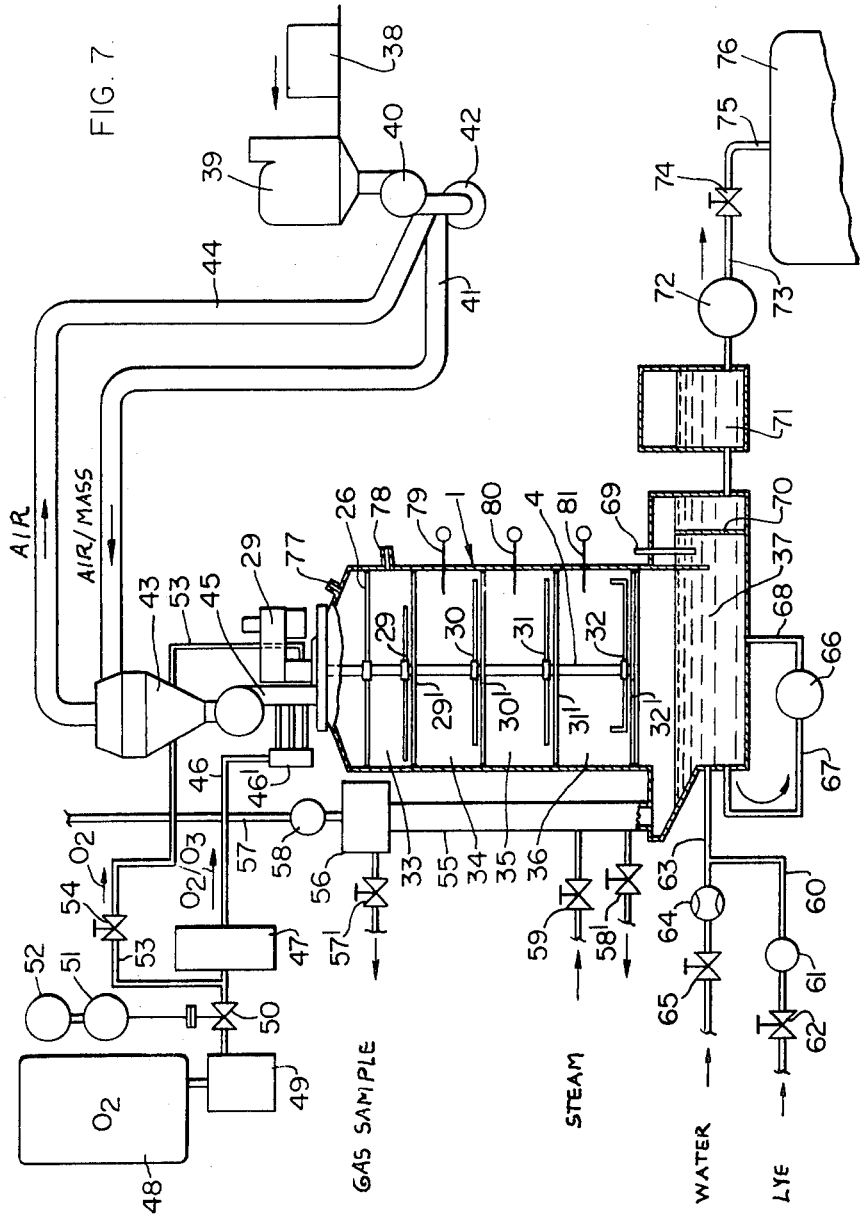

METHOD AND AN APPARATUS FOR PROCESSING FINELY DIVIDED FIBROUS PULP WITH GAS WITHOUT OVERPRESSURE

BACKGROUND OF THE INVENTION

The present invention relates to a method of processing finely divided bulk material with gas without overpressure. The invention also relates to an apparatus for carrying out the method.

The method and the apparatus according to the invention may be used for processing finely divided or flocculent material in general, but has especial utility in the wood pulp and paper industry.

It is to be understood that when a finely divided pulp is referred to in the following, this term is meant to include both mechanical and chemical wood pulp.

In the wood pulp industry it is known to process a finely divided pulp originating from certain types of wood, e.g. fibres of hardwood, with ozone. As a consequence of the ozone process, the fibres of the pulp may be more easily bonded to each other at a later stage of the production process. Since the hardwood fibres are smaller than fibres originating from coniferous trees, they are well suited for mixing with conifer pulp in the production of fine paper, and also in this connection the processing of the hardwood fibres with ozone is favourable for the final paper product.

Thus, the ozone processing is an important step which enhances the strength of mechanical wood pulp, i.e. mass produced by mechanical fibration (grinding/refining) of short-wood or chips.

Further, in the pulp wood industry the use of ozone in bleaching chemical wood pulp, i.e. cellulose, is known. By bleaching the cellulose mass with ozone, the use of chlorine is avoided, which is favourable with respect to pollution.

However, from the literature there are only known apparatus for processing finely divided wood pulp in which the gas is allowed to penetrate into the pulp under overpressure. In processing such pulp with pressurized gas it is difficult in a simple manner to recover the surplus of gas for recirculation. Besides, the processing of a pulp with pressurized gas will easily result in a compression of the pulp to be processed, requiring the pulp to be moved through the reactor by complicated and expensive devices. Apparatus for processing pulp with pressurized gas are therefore unduly expensive and poorly suited for a process using no overpressure of the gas, especially since large gas volumes must in this case be separated from the pulp.

SUMMARY OF THE INVENTION

The object of the present invention is to provide a method for uniformly processing finely divided bulk material with gas without overpressure, in which the processed material may in a very simple manner be separated from the surplus of gas to allow recirculation thereof. Besides, an object of the invention is to provide an apparatus for carrying out the method, the apparatus being marked by having a minimum of movable parts, which signifies an economical and favourable solution.

The method according to the inventions is characterized in that the pulp material is substantially continuously supplied to a reactor, in which it is distributed in a layer which substantially covers the cross section of the reactor, that during the processing the layer is temporarily supported by a perforated surface having sufficiently small apertures for the material to form bridges, that the gas is allowed continuously to flow through the pulp material and over the total cross section of the reactor, and that the pulp is moved through the reactor by allowing the pulp bridges to be broken at appropriate intervals so that batches of the pulp are advanced by gravity downwards in the reactor to merge with subjacent layer or to be removed from the reactor as a finished processed pulp.

The terms "bridges" and "bridging" in this invention means the interaction of individual pulp fibers which acts in a mass as a span across an opening without the compacting of the mass.

A further feature of the method according to the invention is that the quantity of pulp transferred through the reactor per time unit is controlled by altering the interval between the breaking of the bridges relative to the time required for the pulp to build fresh bridges.

The apparatus according to the invention is characterized in that it comprises a container having an inlet for distributing a suitable layer of bulk material, inlet means for fresh gas and outlet means for used gas, one or more subjacent substantially stationary supporting means extending across the total cross section of the reactor and each of which serve temporarily to collect the distributed material in a layer, each supporting means being provided with apertures, the shape and size of which being so adapted to the finely divided material that the material forms pulp bridges acrosss the apertures, said apertures allowing the gas to flow continuously through the bulk material, and a movable breaking means associated with each supporting means and passed by means of actuating means along the upper side of the supporting means in the area of the pulp bridges to break these bridges, so that the pulp under the influence of gravity is advanced downwards in the reactor to merge with a subjacent layer or to be removed from the reactor as finished processed pulp.

A feature of the apparatus according to the invention is that the supporting means may consist of a substantially circular plate, and that the apertures have the shape of substantially radial slots.

Another feature of the invention is that the lower supporting means consists of two circular plates having radial slots, at least one of the plates being provided with actuating means for rotating the plates relative to each other, thereby to allow the slots of each plate to register to a varying extent to control the widths of the combined slots.

Preferably the breaking means may consist of one or more narrow arms which are pivotally attached to a central vertical shaft in the reactor, and which upon rotation of the shaft sweeps across substantially the total surface of the supporting means.

BRIEF DESCRIPTION OF THE DRAWING

The invention will in the following be described in more detail, reference being had to the drawing.

FIG. 7 is a diagrammatic general view of a reactor plant in which the apparatus according to the invention is included as a main part.

DETAILED DESCRIPTION OF THE PREFERRED EMBODIMENT

Figure 1:
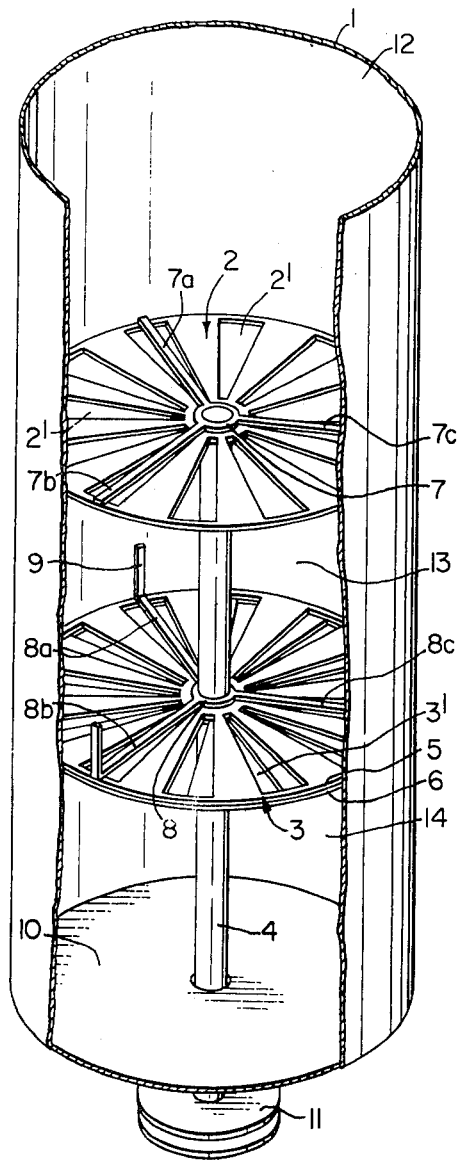
FIG. 1 is a simplified perspective view, partially in section, of an apparatus according to the invention.

In FIG. 1, 1 is the general designation of a cylindircal reactor or container housing an upper supporting means 2 and a lower supporting means 3. The upper supporting means 2 is designed as a circular plate which substantially covers the total cross section of the reactor and is provided with apertures 2' in the form of radial slots. At its periphery the upper supporting means 2 is secured to the inner wall of the reactor 1, and at its central portion it forms a bracing mounting for a central shaft 4 extending in the longitudinal direction of the reactor. The lower supporting means 3 consists of two plates, 5 and 6, respectively, both plates having the same design as the upper supporting means 2. The plate 5 is secured to the inner wall of the reactor and constitutes a bearing for the through shaft 4, whereas the subjacent plate 6 can be rotated relative to the superjacent plate 5 by means which are not illustrated. By rotating the plates 5 and 6 relative to each other, the clear width of the supporting means 3 may be adjusted, preferably in the range from 0 to 50% of the total surface area of the supporting means.

The plates 2, 5 and 6 may preferably be provided with a suitable number of radial slots, e.g. 10 or 12, having a slot cross section which preferably constitutes approximately 50% of the total surface area of the supporting means.

It is to be understood that since the width of the slot increases with the distance from the shaft 4, the width may reach a value which renders the bridge shaping effect of the material impossible. Consequently, the width of the slots must be adapted to the bridge shaping properties of the finely divided material to be processed. If the width of the radial slots at a given distance from the shaft should approach the critical width, the width of the slots may in this area be stepped down. Possibly, slots having a uniform width may be provided in the supporting means, said slots not only extending in a straight radial direction, but also in directions deviating therefrom.

On the upper side of each of the plates 2 and 5, a breaking means 7 and 8, respectively, is attached to the shaft 4, each of the breaking means consisting of three radially overhanging, uniformly spaced arms 7a, 7b, 7c and 8a, 8c, 8b, respectively, a small clearance being left between the free outer ends of the arms and the wall of the reactor. During the processing with gas, water will be generated in the processed pulp and in the lower part of the container 1 there will therefore be a tendency of moisture concentration, which may result in adhesion of the pulp to the reactor walls. Therefore, vertically projecting scraper elements 9, which serve to loosen the pulp along the reactor wall, may suitably be provided on the said free ends of the arms 8a, 8b, 8c of the lower breaking means 8.

The lower part of the container, i.e. the area between the lower supporting means 3 and the bottom 10 of the container, serves to collect the finished processed pulp, which through appropriate outlet openings, not shown, may be passed on for storage or further treatment as will be described further with reference to FIG. 7. The shaft 4 may be rotated by means of a variator, not shown, through a belt pulley 11 at the lower end of the shaft.

During operation the reactor 1 is maintained filled with a fluffy pulp in the chamber 12 above the upper supporting means 2 and in the chamber 13 between the upper supporting means 2 and the lower supporting means 3. Filling of the reactor takes place by charging at the upper end thereof, rotation of the shaft 4 with the breaking means 7 and 8 being started at the same time. During the charging phase, the total clear width of the lower supporting means 3 is reduced to zero, and pulp will then flow through the supporting means 2 until the chamber 13 has been filled, whereupon the chamber 12 is filled to an appropriate height.

It is to be understood that the distance between the supporting means 2 and 3 is adapted so as to avoid both an undue compression of the intermediate layer of finely divided pulp to be processed and fissures therein, so that the gas supplied to the container for processing the pulp may penetrate the entire bulk material and the flow of gas is not disturbed by canalization or short-circuiting which would reduce the effect of the processing with gas.

After the container has been charged with finely divided pulp, the slots of the lower supporting means 3 are opened, the shaft 4 with the breaking means 7 and 8 at the same time being given a suitable speed of rotation. If the breaking means 7 and 8 with their arms 7a, 7b, 7c and 8a, 9b, 8c, respectively, are maintained stationary, no substantial amount of pulp will fall through the container, as pulp bridges then will form across the slot openings 2' in the upper supporting means 2 and across the slot openings 3' in the lower supporting means 3. However, the arms 7a, 7b, 7c and 8a, 8b, 8c will during their sweeping action along the upper surface of the supporting means effect a breaking of the pulp bridges, thereby allowing pulp to flow through the slot openings 2' and 3', respectively, until fresh bridges are again formed there-across.

From the above it will appear that the quantity of pulp flowing through the reactor per time unit is controlled by two variable parameters, i.e. the width of the slot openings 2' and 3' and the frequency of the bridge breaking, which is determined by the speed of rotation and the number of breaking arms of the breaking means 7 and 8. It is further to be understood that an object of the upper supporting plate 2 is to relieve the pulp column. In order to impart a rotation to the pulp through the reactor, the slots of the upper plate 2 may be displaced half a slot pitch relative to the slots of the lower supporting means 3.

Figure 2:
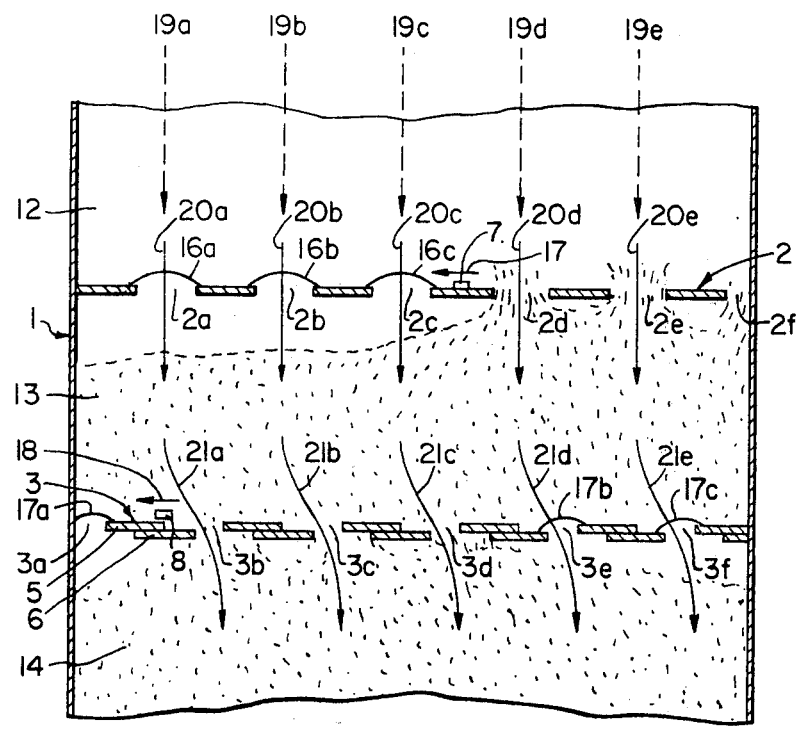
FIG. 2 is a diagrammatic drawing of principle showing the apparatus folded out in a plane, and illustrating the distribution and the transfer of the finely divided pulp through the reactor.

In FIG. 2, which is a diagrammatic drawing of principle of the apparatus folded out in a plane, the distribution and the transfer of the finely divided pulp through the reactor are further illustrated. Here it is shown that pulp bridges 16a, 16b and 16c have formed across the three leftmost slot openings 2a, 2b and 2c of the upper supporting means 2, whereas in the area of the three slots 2d, 2e and 2f to the right such bridges do not exist any longer, the breaking means 7 just having passed the areas thereof in the direction of the arrow 17 in the Figure.

The same condition as described above in connection with the supporting means 2, prevail at the lower supporting means 3. In FIG. 2 bridges are indicated at 17a, 17b and 17c for the supporting means 3, whereas flow of the finely divided bulk material is indicated at the slots 13a, 13b and 13c, the breaking means 8 during its movement in the direction of the arrow 18 having just passed said slots and no pulp bridges having yet formed thereacross. The arrows 19a–19e, 20a–20e and 21a–21e illustrate the flow of gas through the finely divided material. Due to the one half pitch displacement of the slot openings of the upper supporting means 2 relative to the slots of the supporting means 3, a certain rotational movement will be imparted to the gas passing the pulp, and, as explained above, such a movement will also be imparted to the pulp when transferred through the reactor.

The main object of the sweeping arms 7a, 7b and 7c of the upper breaking means 7 is to induce a passage of finely divided pulp from the chamber 12 to the subjacent chamber 13, so that this chamber is at all times filled with an appropriate pulp layer. The transportation of pulp through the reactor is effected both as a consequence of the pulp being shoved through the slots by the arms 7a–7c and 8a–8c, and the pulp falling freely through the slots when the pulp bridges are broken.

Experiments have indicated that the sliding movement of the arms is responsible for approximately 40% of the total transfer of the pulp, whereas the remaining part of the pulp, i.e. approximately 60%, passes through the reactor by falling freely through the slots before the bridges rebuild. The stated figures may, of course, vary within wide limits depending upon the design of the reactor.

Due to the manner in which the finely divided material is transported through the reactor, there is obtained a process which is not only continuous but also self-regulating. As mentioned, a first part of the pulp will pass through the slots due to the sweeping movement of the breaking arms. This first part of the pulp will reach the subjacent pulp layer prior to the second part of the pulp which falls freely through the slots by gravity only. This freely falling part will continue to fall until fresh bridges have been formed across the slots, provided that space for this second part of the pulp is available in the subjacent chamber. If space is not available therein for this second part of the pulp, this will simply remain in the subjacent chamber. The only control necessary in the present method is to adapt the quantity of pulp fed to the reactor to the quantity of pulp removed therefrom. Otherwise, complicated and expensive equipment for controlling the individual internal flows or quantities of pulp from chamber to chamber is obviated, such equipment being indispensable in known apparatus working with compressed gas.

In order to obtain an even distribution of pulp in the chamber 13, one or more arms may preferably be provided on the shaft 4 just below the supporting means 3, said arms swinging together with the shaft and sweeping across and levelling the upper surface of the pulp column. Such a levelling of the pulp column reduces the risk of formation of vertical passages in the pulp column, which may give rise to gas passed through the passages without coming into contact with all the pulp particles.

If it is desired to increase the residence time of the pulp in the reactor, the slot width of the lower supporting means 3 may be reduced, at the same time reducing the speed of rotation of the shaft and thereby the sweeping velocity of the breaking arms 7 and 8.

Figure 3:
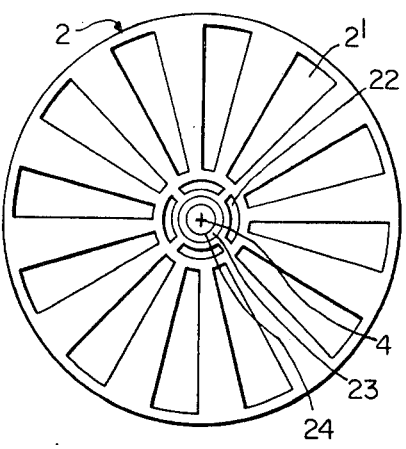
FIG. 3 is a plan view of an embodiment of a supporting means.

In FIG. 3 an embodiment of a supporting means 2 consisting of a circular metal plate or disc is shown. In the plate there are provided twelve radial slots 2' which extend radially from the centre of the plate towards the periphery thereof and have a uniformly increasing width. In the centre of the plate there are provided other smaller slots 22 which extend substantially transversly to the longitudinal direction of the radial slots. During the transfer of the finely divided pulp, the slots 22 assist in accummulating pulp close to the shaft 4 of the chamber 13, so as to avoid canalization of the gas along the shaft. In FIG. 3 there is further indicated a combined sliding and bracing bearing 23 for the central shaft 4, which extends through an opening 24 in the centre of the plate.

Figure 4:
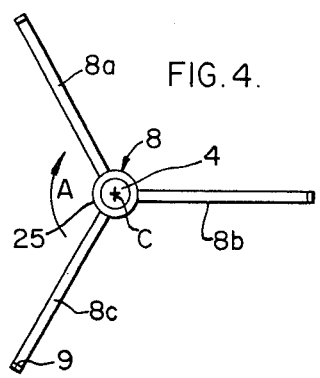
FIG. 4 is a plan view of a breaking means.
Figure 5:
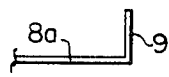
FIG. 5 is a side view of the end portion of a breaking arm as illustrated in FIG. 4.

In FIG. 4 there is shown an embodiment of a breaking means, e.g. the one indicated at 8 in FIG. 1, said means consisting of a centre ring 25 to which is secured three overhanging arms 8a, 8b and 8c. The centre ring 25 is fitted onto the through central shaft 4, and at each of the free ends of the arms there is, as best illustrated by the arm 8a in FIGS. 1 and 5, provided an upwardly protruding scraper element 9 which serves to loosen pulp along the wall of the reactor. The arrow A in FIG. 4 indicates the direction of rotation of the breaking means 8, and the leading edge of the breaking arms 8a–8c extends radially to the vertical shaft and thus intersects the axis C thereof.

Figure 6:
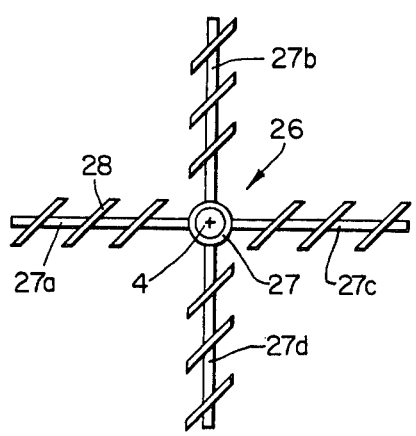
FIG. 6 is a plan view of a distribution means.

In FIG. 6 there is shown a distribution means 26 which may suitably be provided on the shaft 4 at the inlet to the upper chamber 12. The distribution means mainly consists of a hub 27 carrying four arms 27a, 27b, 27c and 27d which are arranged, substantially at right angles to each other, inclined baffle elements 28 provided on each arm 27a–27d serving to deflect and distribute the incoming, finely divided pulp.

In FIG. 7 there is shown a diagrammatic general view of a plant for processing finely divided material with gas, the reactor according to the invention forming a main part of the plant. In FIG. 7, 1 designates, as before, the reactor and 4 the central through shaft driven by a diving means 29' provided at the top of the reactor 1. A distribution means 26 is mounted on the shaft 4 in the upper part of the reactor 1, said means e.g. being of the type illustrated and described in connection with FIG. 6. On the same shaft there are also mounted four breaking means 29, 30, 31 and 32, each of the breaking means being provided directly above the respective stationary supporting means 29', 30', 31' and 32'. The four supporting means 29'–32' divide the reactor into four chambers 33, 34, 35 and 36, respectively. Below the lower supporting plate or means 32', which, besides, as described in connection with FIG. 1, consists of two slotted plates which may be rotated relative to each other for altering the respective clear width, there is provided a collecting chamber 37 in which the finished processed pulp is collected, an appropriate liquid being supplied thereto. The collecting chamber 37 is formed so as to act as a lock for the further flow of gas.

As indicated to the right in FIG. 7, wood pulp 38 is supplied to a fluffer mill 39 in which the wood pulp is processed to a finely divided, fluffy pulp. The fluffy pulp is passed to a transportation pipe 41 by a feeding means 40. By pressurized air supplied from a blower 42 the pulp is transported through the pipe 41 to a cyclone 43 mounted at the top of the reactor. Surplus air is recirculated to the blower 42 through a return pipe 44.

After having passed the cyclone 43 the finely divided pulp is transported through a mixing chamber 45 wherein $O_2/O_3$-gas supplied via a pipe 46 and a manifold 46' is added to the pulp. In FIG. 7, 47 further designates an ozone generator, 48 an oxygen container, 49 a vaporizer, 50 a regulating valve and 51 a compressor with its drive motor 52. The oxygen container 48 contains liquid oxygen which in the vaporizer 49 is converted to oxygen in gas form, whereafter the vaporized gas passes through the regulating valve 50 in order either to be passed into the ozone generator 47 for the generation of ozone or to be supplied to the reactor at the top thereof as a sealing gas for the rotating journal by tapping through a branch pipe 53 having a valve 54.

Gas and finely divided pulp are supplied from the mixing chamber 45 to the top of the reactor and distributed in the chamber 33 by the distribution means 28. The bulk material together with $O_2/O_3$-gas is substantially continuously supplied to the reactor, wherein it is distributed in layers in the chambers 33, 34, 35 and 36. During the processing each layer is supported by a supporting means 29', 30', 31' and 32', the material being allowed to form bridges across the apertures therein. The supplied gas flows continuously through the layers of bulk material across the total cross section of the reactor, so that the gas comes into intimate contact with all the pulp particles. After the gas has passed through the layers of finely divided material, it is removed from the reactor through a pipe 55 and a test chamber 56 and further through an outlet pipe 57 by a pump 58, and recirculated to the system, if desired.

A valve 57' for taking gas samples is indicated in the test chamber 56 and close to the bottom of the outlet pipe 55 there is also provided a valve 58' for the same purpose, whereas a valve 59 controls a steam supply to the outlet pipe 55 in case it is desired to destruct the surplus of ozone escaping from the reactor 1.

As explained above in connection with FIG. 1 and FIG. 2, the transfer of pulp through the reactor takes place by repeated breaking of the pulp bridges, so that the pulp under the infuence of gravity is passed further downwards in the reactor in batches for merging with a subjacent layer or removed from the reactor as a completely processed pulp in the collecting chamber 37.

The breaking of the pulp bridges is effected by arms which rotate with the central shaft 4, said arms also to a certain degree acting to shove pulp to the apertures in the supporting means. The quantity of the pulp transferred through the reactor per time unit is dependent on the interval between repeated breaking of the bridges and the time required for the material to build fresh bridges. With a finely divided material which easily forms bridges, the shaft must rotate at a higher speed for the same reactor capacity to be obtained, whereas the relationship is opposite when treating a finely divided pulp which does not exhibit such a strong tendency to form pulp bridges.

The processed pulp in the distribution chamber 37 is mixed therein partly with lye, preferably sodium hydroxide, supplied through a pipe 60 having a pump 61 and a regulating valve 62 and partly with diluting water supplied through a pipe 63 having a quantity meter 64 and a valve 65. In FIG. 7, 66 designates a circulation pump which circulates the diluted, completely processed pulp through pipelines 67 and 68 connected to the collecting chamber 37. In the collecting chamber 37 a pH-meter 69 is inserted, and to prevent the collecting chamber 37 from being emptied there is provided a partition 70 over which the processed and circulated diluted mixture must pass in order to proceed to a buffer tank 71. By a transportation pump 72 the diluted pulp is passed from the buffer tank 71 via a pipeline 73, a valve 74 and a second pipline 75 to a storage container 76 from which it may be supplied to paper-making machines via further processing means.

The processing of finely divided mass with ozone results in a low pH-value of the pulp, e.g. in the range of 3-4, when leaving the reactor. In order to stabilize the properties of the pulp — especially the properties imparted to the pulp by processing with ozone — lye is added to the pulp to obtain an alkaline pH-value. Lye is added to the pulp in the distribution chamber and in case of mechanical pulp the pH-value is preferably altered to e.g. 8 to 9 before the pulp is removed to storage or to the next process stage. It is to be understood that when storage time is referred to in the following, this term is meant to define the time from the moment when the pulp leaves the reactor till the pulp is charged into the next process stage. During storage the pH-value will decrease, and the original pH-value and the storage time are preferably being so adapted as to provide an approximately neutral pulp at the end of the storage period. In case of chemical pulp (cellulose) the quantity of lye required to obtain a suitable pH-value depends upon the type of cellulose (sulphate pulp or sulphite pulp) as well as its preparation and especially its residual content of lignin.

In the upper part of the reactor two level indicators 77 and 78 are provided which monitor and register the level in the upper chamber 33. Similar level indicators may be provided at other locations of the reactor to provide additional information about the thickness of the layers etc. in the remaining chambers of the reactor. 79, 80 and 81 indicate temperature sensors for monitoring and registration of the temperature in the chambers 34, 35 and 36. By the method and the apparatus according to the invention a finely divided pulp may be processed with gas without overpressure. This entails that the parts included in the reactor plant may be made at lower cost, only conventional commercially available equipment being used. Simultaneously, the dangers which always are associated with overpressure plants and which require additional safety measures and expensive monitoring equipment are avoided.

The method and apparatus according to the invention indicate a continuous process which may be regarded as self-controlled, a recirculation of the gas used in the processing also being achieved.

By means of simple parameters such as speed of rotation of the shaft and the widths of the slots of the supporting means, the residence time of the finely divided pulp in the reactor may be adjusted within a very large range.

The parts of the reactor proper are very simple, whereby the manufacturing and installation costs are reduced, the service and maintenance of the plant being at the same time reduced to a minimum.

Of course, the invention may be carried out in several other ways without departing from the scope defined by the patent claims. For example, the gas and the bulk material may be supplied to the upper part of the reactor, the gas being used as a means of transporting the material. In this case, additional quantities of gas may preferably be supplied to the upper part of the reactor. It is to be understood that the processing with gas may be effected in co-current flow as well as countercurrent.

Further, the invention may be carried out by means of an apparatus in which several of the above described reactors are connected in series, an appropriate device for treating the pulp with lye being provided between each apparatus. After each treatment with lye the pulp is pressed and is thereafter by suitable means given a fluffy texture before it is charged to the next reactor.

As known, ozone may be generated not only from $O_2$ but also from air, and in an alternative embodiment of the invention the oxygen container 48 may be replaced by an inlet for the supply of air.

What we claim is

1. A method of treating finely divided fibrous pulp with a gas without overpressure, comprising the steps of substantially continuously supplying pulp to a reactor having a plurality of stages, said pulp being distributed in layers which substantially cover the entire cross-section of the reactor, each stage being divided by a surface having sufficiently small radially extending apertures evenly distributed across the entire cross-section of the reactor for the pulp to form bridges temporarily supporting each layer in turn, the pulp being conveyed from stage to stage by gravity; continuously flowing the gas through all of the apertures and through the temporarily supported pulp over the entire cross-section of the reactor; and breaking the pulp bridges at periodic time intervals thereby advancing the pulp downwards through the apertures from one stage to another for merging with a subjacent layer or to be removed from the reactor as a processed pulp.

2. The method as claimed in claim 1, wherein the quantity of pulp transferred through the reactor per time unit is controlled by altering the interval between the breaking of the bridges relative to the time required for the pulp to build fresh bridges.

3. The method as claimed in claim 1, wherein the gas and the pulp are supplied to the reactor at the upper part thereof, said pulp being transported by the gas to the reactor.

4. The method as claimed in claim 3, wherein additional quantities of gas are supplied at the upper part of the reactor.

5. The method as claimed in claim 1, wherein air is used to transport the pulp to the reactor, the gas being supplied to the reactor by a separate supply means.

6. The method as claimed in claim 1, wherein the gas is recirculated after having passed through the pulp of the reactor.

7. The method as claimed in claim 1, wherein the pulp after its transfer through the reactor is collected in a chamber which acts as a separator for said gas and said pulp.

8. The method as claimed in claim 7, comprising the further step of adding lye to the pulp in the collecting chamber in an amount such as to give the pulp an alkaline pH-value.

9. The method as claimed in claim 7, comprising the further step of adding lye in an amount of approximately 2 percent by weight of the dry pulp to the pulp in the collecting chamber.

10. The method as claimed in claim 1, wherein the gas flows through the reactor in co-current flow with said pulp.

11. The method as claimed in claim 1, wherein the gas flows through the reactor in countercurrent flow with regard to said pulp.

12. The method as claimed in claim 1, wherein a small rotation is imparted to the mass when flowing through the reactor.

13. Apparatus for treating finely divided fibrous pulp with gas without overpressure, comprising a reactor having an inlet for distributing a suitable layer of pulp, inlet means for fresh gas and outlet means for used gas, a rotatable central shaft having an axis, one or more subjacent substantially stationary supporting means, each extending across substantially the total cross-section of the reactor and each serving temporarily to collect the distributed pulp in a layer, each supporting means being provided with generally radially extending apertures evenly distributed across the total surface of the supporting means and having a shape and size allowing the finely divided pulp to form bridges across the apertures, said apertures allowing the gas to flow continuously through the pulp, and movable breaking means associated with each supporting means and advanced by driving means along the upper side of the supporting means in the area of the pulp bridges to break these bridges so that the pulp under the influence of gravity is advanced downwards in the reactor to merge with a subjacent layer or to be removed from the reactor as finished processed pulp.

14. Apparatus as claimed in claim 13, wherein the supporting means comprises a substantially circular plate, and that the apertures take the shape of substantially radial slots.

15. Apparatus as claimed in claim 14, wherein the slots provide an open cross-section of the supporting means of approximately 50%.

16. Apparatus as claimed in claim 14, wherein the slots of each supporting plate are disaligned relative to the slots of the next plate for thereby achieving a rotating effect on the pulp when this is advanced through the reactor.

17. Apparatus as claimed in claim 13, wherein the size of the apertures is controllable.

18. Apparatus as claimed in claim 14, wherein the radial slots terminate to close to the central shaft in the area of which are provided other slots extending transversely to the radial slots.

19. Apparatus as claimed in claim 13, wherein the lower supporting means comprises two circular plates having radial slots, at least one of the plates being provided with actuating means for rotating the plates relative to each other thereby allowing the slots in each plate to register to a lesser or larger extent for adjusting the width.

20. Apparatus as claimed in claim 13, wherein each of the breaking means comprises one or more narrow arms which are pivotally secured to the central vertical shaft of the reactor and which upon rotation of the shaft sweep across substantially the total surface of the supporting means.

21. Apparatus as claimed in claim 20 wherein the leading edge of each breaking arm is intersectingly aligned perpendicular to the axis of the vertical shaft.

22. Apparatus claimed in claim 20, wherein the breaking arms at their outer ends are each provided with a vertically protruding scraper element which serves to loosen pulp along the wall of the reactor.

23. Apparatus as claimed in claim 13, further comprising beneath each supporting means, one or more arms pivotally mounted on the central rotatable shaft, said arms serving to sweep through and level the upper surface of the pulp column.

24. Apparatus as claimed in claim 13, further comprising a collecting chamber provided at the discharge end of the reactor, said chamber serving to collect the finished processed pulp and to block further flow of gas therethrough.

25. Apparatus as claimed in claim 24, still further comprising two supply conduits, one each for lye and water, respectively, connected to the collecting chamber.

* * * * *